United States Patent [19]

Reilly et al.

[11] E Re. 30,083

[45] Reissued Aug. 28, 1979

[54] IRON TITANIUM MANGANASE ALLOY HYDROGEN STORAGE

[75] Inventors: James J. Reilly, Bellport; Richard H. Wiswall, Jr., Brookhaven, both of N.Y.

[73] Assignee: The United States of America as represented by the United States Department of Energy, Washington, D.C.

[21] Appl. No.: 849,569

[22] Filed: Nov. 8, 1977

Related U.S. Patent Documents

Reissue of:

[64] Patent No.: 3,922,872
Issued: Dec. 2, 1975
Appl. No.: 547,073
Filed: Feb. 4, 1975

[51] Int. Cl.[2] ..... F26B 5/04

[52] U.S. Cl. ..... 34/15; 62/48; 75/134 F; 75/175.5; 252/471; 423/248; 423/644

[58] Field of Search ..... 62/48; 75/175.5, 134 F; 252/471; 423/248, 644; 34/15

[56] References Cited

U.S. PATENT DOCUMENTS

| | | | |
|---|---|---|---|
| 2,798,806 | 7/1957 | Jaffee et al. | 75/175.5 |
| 3,508,414 | 4/1970 | Wiswall, Jr. et al. | 62/48 |
| 3,516,263 | 6/1970 | Wiswall, Jr. et al. | 62/48 |

OTHER PUBLICATIONS

*An Engineering Scale Energy Storable Reservoir of Iron Titanium Hydride:* G. Strickland et al., Mar. 18-20, 1974.

*Iron Titanium Hydride as a Source of Hydrogen Fuel for Stationary and Automotive Applications:* J. J. Reilly et al., May 1974.

*Primary Examiner*—Ronald C. Capossela
*Attorney, Agent, or Firm*—Dean E. Carlson; Leonard Belkin; Jack Q. Lever, Jr.

[57] ABSTRACT

A three component alloy capable of reversible sorption of hydrogen having the chemical formula $TiFe_{1-x}Mn_x$ where x is in the range of about 0.02 to 0.5 and the method of storing hydrogen using said alloy.

5 Claims, 2 Drawing Figures

IRON TITANIUM MANGANASE ALLOY HYDROGEN STORAGE

Matter enclosed in heavy brackets [ ] appears in the original patent but forms no part of this reissue specification; matter printed in italics indicates the additions made by reissue.

BACKGROUND OF THE INVENTION

The invention described herein was made in the course of, or under a contract with the U.S. Atomic Energy Commission.

Hydrogen is a potential fuel for various types of power sources, such as fuel cells, internal combustion engines, gas turbines, etc. It has two great advantages over fossil fuels, it is essentially nonpolluting and it can be produced using several all but inexhaustible energy sources, i.e., solar, nuclear and geothermal. However, a major problem is the difficulty encountered in its storage and bulk transport. Conventional storage methods, i.e., compression and liquefaction, do not appear to be practical in this context.

A possible solution to the problem lies in the use of a metal hydride as a hydrogen storage medium. Several hydrides are of interest but the material most near to practical application is iron titanium hydride, which can be synthesized through the direct union of hydrogen with the intermetallic compound, FeTi.

Our U.S. Pat. Nos. 3,508,414 and 3,516,263 disclose methods and apparatus for utilizing iron-titanium alloys to store hydrogen by the formation of hydrides.

One difficulty which has been discovered in the use of iron-titanium alloys for hydrogen storage is the effect of the presence of oxygen in the alloys in small amounts. For example, it has been discovered that the presence of oxygen in the amount of 7000 ppm in commercially available iron-titanium reduced substantially the maximum hydrogen that could be stored and the equilibrium dissociation pressure was increased. This had the effect of increasing the costs involved in storing hydrogen by the use of these alloys.

SUMMARY OF THE INVENTION

It has been discovered that the addition of manganese to the intermetallic alloy FeTi in certain specific amounts not only increases the amount of $H_2$ which can be stored and at a lower pressure but also has the effect of compensating to a significant extent for the presence of oxygen, permitting significant increases in the amounts of hydrogen which can be stored under more convenient and economical pressures.

In accordance with a preferred embodiment of this invention there is provided a three component alloy capable of reversible sorption of hydrogen having the chemical formula $TiFe_{1-x}Mn_x$ where x is in the range of about 0.02 to 0.5.

There is also provided, in accordance with another preferred embodiment of this invention, a method of storing hydrogen comprising contacting gaseous hydrogen with a solid alloy of $TiFe_{1-x}Mn_x$ where x is in the range of about 0.02 to 0.5.

It is thus a principal object of this invention to provide an improved alloy for the chemical storage of hydrogen.

Another purpose is to provide an improved method for the storage of hydrogen.

Other objects and advantages of this invention will hereinafter become obvious from the following description of preferred embodiments of this invention.

DESCRIPTION OF THE BACKGROUND EMBODIMENTS

An alloy in accordance with this invention may be prepared by melting granules or small ingots of Fe, Ti, and Mn in an arc or induction furnace within an inert atmosphere followed by cooling.

The cooled alloy, in order to be utilized for the storage of hydrogen is comminuted or granulated and then activated by outgassing at high temperature (300° C.) and exposing to $H_2$ for a short time followed by outgassing again and cooling under hydrogen with about 1 atmosphere pressure.

In order to form the hydride the activated alloy is exposed to $H_2$ at a pressure usually 10 atmospheres above dissociation pressure at that temperature, due to hysteresis type effects. The hydriding pressure should for best results be at least twice the dissociation pressure because of the already mentioned hysteresis effect.

EXAMPLES

Figure 1:
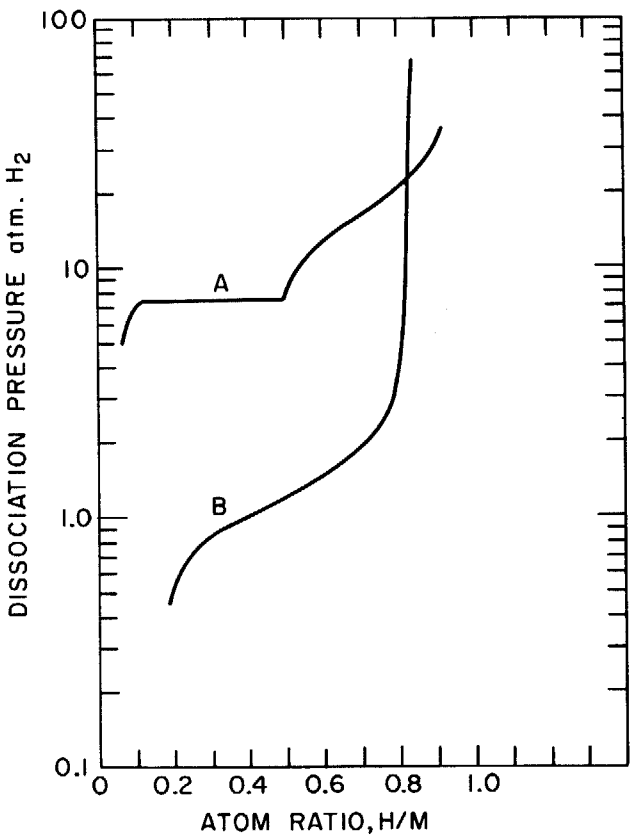

An alloy was prepared with the composition (A) of FeTi and the dissociation pressure-composition isotherms for this alloy are shown in FIG. 1. The $H_2$ dissociation pressure of this alloy can be seen from the curve at 40° C. to be at least 7.2 atmospheres and reaches 25 atmospheres at the maximum $H_2$ concentration. A similar alloy (B) was prepared in which some of the iron was displaced by Mn and had the formula $TiFe_{0.7}Mn_{0.3}$. The dissociation pressures for this alloy at the same temperature, as shown in FIG. 1, range from 0.42 to 9 atmospheres for the same amount of stored $H_2$ as in alloy (A). In the drawing, the atom ratio, H/M is defined as the ratio of atoms of hydrogen to total atoms of metal.

Figure 2:
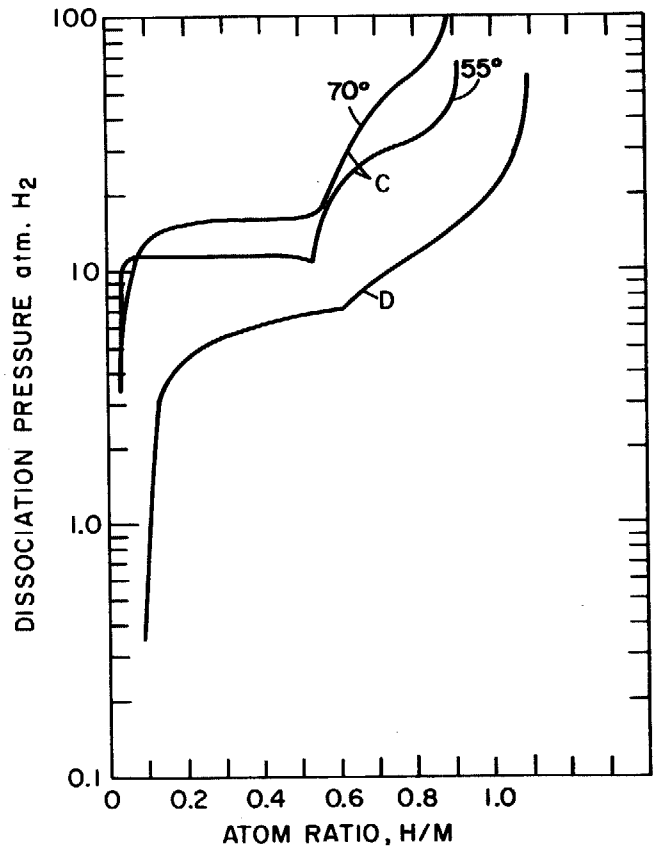
FIGS. 1 and 2 show curves illustrating the $H_2$ storage characteristics of alloys incorporating the principles of this invention and comparing them with similar alloys not incorporating this invention.

It was found that for other temperature conditions the presence of Mn displacing some of the iron additionally made it possible to increase the amount of $H_2$ which could be stored as well as reducing the dissociation pressure. Curves C in FIG. 2 shows isotherms for a FeTi alloy at 55° and 70° C. while curve D shows the isotherm at 61° C. for the composition $TiFe_{0.8}Mn_{0.2}$. Not only does alloy D have a lower dissociation pressure but in addition $H_2$ storage capacity was increased by about 10 percent by weight. This is shown by the upper limits of the curve.

What is claimed is:

1. A three component alloy capable of reversible sorption of hydrogen having the chemical formula $TiFe_{1-x}Mn_x$ where x is in the range of about 0.02 to 0.5.

2. The method of storing hydrogen comprising contacting a solid alloy of $TiFe_{1-x}Mn_x$ where x is in the range of about 0.02 to 0.5 with gaseous $H_2$ at a pressure above the dissociation pressure of the hydride.

3. The method of claim 2 in which the pressure of $H_2$ during contacting is at least twice the dissociation pressure of the hydride for the temperature during contacting.

4. The method of claim 3 in which the pressure of $H_2$ during contacting is about ten times the dissociation pressure of the hydride for the temperature during contacting.

5. *The product of the method of claim 2.*

* * * * *